US007491064B1

(12) United States Patent
Barton et al.

(10) Patent No.: US 7,491,064 B1
(45) Date of Patent: Feb. 17, 2009

(54) SIMULATION OF HUMAN AND ANIMAL VOICES

(76) Inventors: Mark R. Barton, 839 Salisbury Rd., La Canada Flintridge, CA (US) 91011; John Ross, c/o 839 Salisbury Rd., La Canada Flintridge, CA (US) 91011

( * ) Notice: Subject to any disclaimer, the term of this patent is extended or adjusted under 35 U.S.C. 154(b) by 923 days.

(21) Appl. No.: 10/850,340

(22) Filed: May 19, 2004

Related U.S. Application Data

(60) Provisional application No. 60/471,932, filed on May 19, 2003.

(51) Int. Cl.
*G09B 23/28* (2006.01)

(52) U.S. Cl. .......... 434/266

(58) Field of Classification Search .......... 434/185, 434/262, 266, 267, 268, 272; 446/267, 397, 446/416

See application file for complete search history.

(56) References Cited

U.S. PATENT DOCUMENTS 3,872,525 A * 3/1975 Lea et al. .......... 5/671
3,874,093 A * 4/1975 Garbe .......... 434/265
4,109,103 A 8/1978 Zagoruiko et al. .......... 179/15 G
4,489,440 A 12/1984 Chaoui .......... 381/70
4,633,864 A 1/1987 Walsh .......... 128/207
4,773,412 A 9/1988 Blom .......... 128/207
4,774,945 A 10/1988 White et al. .......... 128/207
4,929,211 A * 5/1990 Resnick et al. .......... 446/14
5,123,922 A 6/1992 Berg .......... 623/9
5,509,810 A * 4/1996 Schertz et al. .......... 434/262
5,690,586 A * 11/1997 Wilhelm .......... 482/49
5,718,227 A * 2/1998 Witlin et al. .......... 600/528
5,817,036 A * 10/1998 Anthony et al. .......... 601/3
6,014,448 A 1/2000 Alton, Jr. .......... 381/351
2003/0161493 A1 8/2003 Hosler .......... 381/353

OTHER PUBLICATIONS

Von Kempelen Speaking Machine "Speech Analysis Synthesis + Perception" Pub. 1983 by Springer-Verlag, Berlin pp. 205, 206 Fig. 10 + Reisz Machine—p. 207.
"Faber's Talking Machine"—"Speech Synthesis" by Coker, Denes + Pinson Pub. Bell Telephone Labs 1963, p. 5.
"Speech Production by a Mechanical Model: Construction of a Vocal Tract and its Control by Neural Network" by Higashimoto et al Pub Faculty of Engineering, Kanagalia University, Japan p. 2.

* cited by examiner

*Primary Examiner*—Kurt Fernstrom
(74) *Attorney, Agent, or Firm*—Robert W. Usher

(57) ABSTRACT

A simulated part of the human vocal tract above the glottis is formed as a resiliently flexible, cylindrical tube with a wall of sponge/foam saturated with water and covered by a thin, flexible water retaining skin. The wall can also be a gel or skin balloon filled with water or oil. A speech simulator has a buzz generator formed by an air compressor, accumulator and regulator supplying air to an chamber filled with sound absorbing batting and having a tubular outlet connected to an inlet end of the tube and covered by a valve simulating a glottis and vocal chords and formed by a rubber membrane slit to provide two flaps controlled by respective pen motors. the tube can be constricted manually to provide various animal and human vocal sounds.

16 Claims, 1 Drawing Sheet

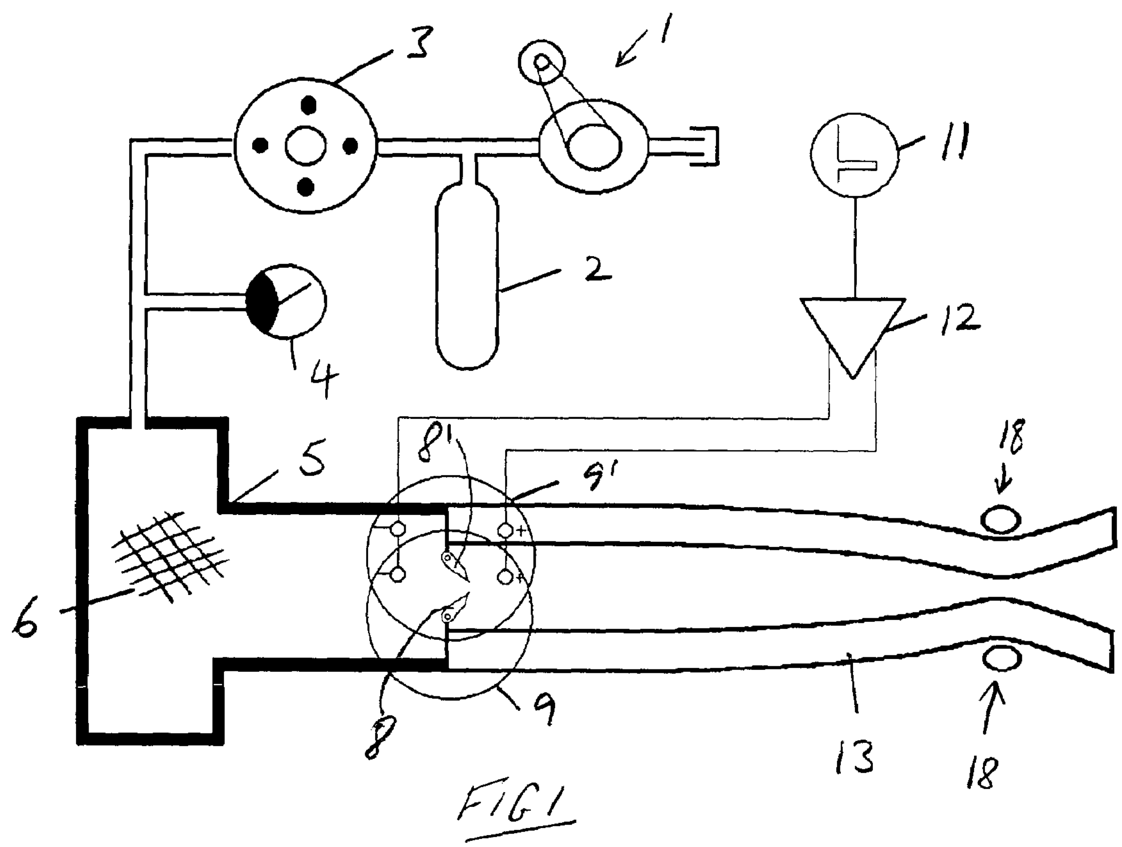
FIG 1
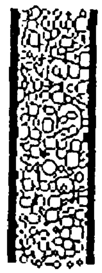
Fig 2
Fig 3
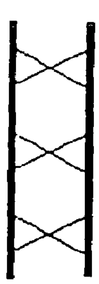
Fig 4

SIMULATION OF HUMAN AND ANIMAL VOICES

RELATED APPLICATION

Priority is claimed from provisional application 60/471,932, filed May 19, 2003, the disclosure of which is incorporated herein by reference.

FIELD OF THE INVENTION

The invention relates to an acoustically reflective material comprising a confined body of liquid for forming a flexible reflective wall of an acoustic resonant cavity in human and animal vocal sound duplication devices—simulacrum or talking robots. The invention includes liquid wall acoustic resonators comprising reflective wall portions consisting essentially of such materials and suitable, for example, for forming simulated vocal tracts and for use in human and animal vocal sound duplication devices including such resonators as vocal tracts.

BACKGROUND OF THE INVENTION

The process of voiced human speech begins when air from the lungs passes through the vocal cords (glottis) causing them to vibrate. This vibration interrupts the air flow at a quasi-periodic interval perceived as pitch. The vocal cord wave is spectrally wide mainly due to the abrupt closure every cycle which produces a discontinuity in the volume velocity waveform. This wave (if it were possible to hear in isolation) sounds like a raspy buzz, rich in harmonics, like a trumpet mouthpiece blown without the trumpet. The vocal tract from glottis to lips and soft palate to nose (the nasal branch) is a complex resonant cavity which acts as a multiple pole and zero linear filter (1). Different vocal cord harmonics are selectively amplified or attenuated depending on the position of the articulators (tongue, lips, jaw, etc.). This results in an array of amplitude peaks called "formants" seen in the frequency domain. They are usually labeled F1, F2, F3, F4 . . . in order of increasing frequency. In continuous speech, the migration of these resonances to different frequencies encodes the linguistic information on the vocal cord wave. It is necessary that these formants be both narrow enough to be well defined, and loud enough to be perceived, i.e. the formant resonances must be of high Q. Table I. shows the location of the first three formant peaks for the average adult male along with the approximate location of the main point of constriction along the tract which is responsible for the vowel.

TABLE I

| Vowel | F1 | F2 (2) | F3 | main constriction |
|---|---|---|---|---|
| uniform tube 17 cm | 500 | 1500 | 2500 Hz | none |
| ee | 270 | 2290 | 3010 | front |
| eh | 530 | 1840 | 2480 | front |
| ah | 730 | 1090 | 2440 | mid |
| ae | 660 | 1720 | 2410 | mid |
| oo | 300 | 870 | 2240 | back |
| er | 490 | 1350 | 1690 | back |

The term "Q", which is a dimensionless figure, stands for quality factor, is equal to frequency/bandwidth (Q=f/bw), which means narrow bandwidths are equivalent to high Q. In speech, higher Q is also associated with greater formant amplitudes which contributes to their perception. The formant bandwidths of the human vocal tract are astonishingly narrow (3) corresponding to Q values in excess of 40.

In order to construct a device which will produce continuous speech, a material had to be found that produced high Q resonances when used as the wall of the simulated vocal tract. In addition to this quality, it must be easily and quickly deformable to transition smoothly through the needed cross sectional area profiles.

There have been numerous prior attempts both to simulate the natural human voice and to provide assisted speech for people with damaged vocal chords.

An early attempt at a speech simulator was the Von Kempelen Speaking Machine referenced in "Speech Analysis, Synthesis and Perception", published 1983 by Springer-Verlag, pages 205/6; FIG. 10 which taught provision of a reed vibrated by air from a bellows and having a manually manipulated resonating tube made from leather. As disclosed on page 207 of the above reference, Reisz also teaches soft rubber for parts of an artificial mouth and pharynx of a speech simulator.

More recent prior art "Speech Production by a Mechanical Model: Construction of a Vocal Tract and its Control by Neural Network' by Higashimoto et al, Faculty of Engineering, Kanagawa University teaches, on page 2, construction of a vocal tract and chord from silicone rubber molded with the softness of human skin.

However, when various non-porous, flexible materials were tried by us in multiple attempts to duplicate simple resonances (uniform tube and cross section for vowel /a/), it was found that the bandwidths of the resonances that were observable on a spectrograph were too wide to be perceived aurally. Also, some formants were misplaced in frequency and others were non-existant. Vowel recognition for the static /a/ model was nil. Rubber, and rubber like, materials ranging from soft latex to semi-rigid tire-like rubber were tried with unacceptable results. The test equipment could produce perfectly acceptable formants when a rigid material was used such as cast stone or hard plastic pipe. The question therefore arose as to how humans with softly compressible, flexible tongues and cheeks are able to produce such wonderfully defined formants with high Q.

A survey using a surface acoustic resonator was then begun by us to find a material that was both soft and flexible, yet possessed acoustic properties similar to those of glass, stone, metal, or hard plastic. All these materials have very high acoustic reflectivities (4). Plastics and rubbers, even when only minimally deformable, were found to be too soft (acoustically absorbant) to make a flexible high-Q resonator directly.

The acoustic reflectivity of liquid water is almost total and it was realized and then verified experimentally by us that the liquid water contained within human and animal flesh made narrow formant bandwidths possible.

SUMMARY OF THE INVENTION

One object of the invention is to provide an acoustically reflective material which is suitable for constructing a resonator simulating a portion of a vocal tract above the glottis for use in human and animal vocal sound duplication devices.

According to one aspect, the invention provides an acoustic reflector comprising a flexible, solid body of open cell, sponge/foam in which substantially all cells thereof are filled with the liquid or a flexible body of gel material and having surfaces covered by a thin, flexible impervious skin to improve retention of liquid in the sponge/foam or gel.

According to another aspect, the invention provides an acoustic resonant cavity for use in apparatus for simulating one of human and animal vocal sounds comprising a flexible wall portion consisting essentially of a confined body of liquid.

The invention also provides a device simulating a portion of a vocal tract above a glottis comprising an elongate tube having a longitudinally extending, flexible wall portion consisting essentially of a confined body of liquid.

The invention further provides apparatus for simulating one of human and animal vocal sounds comprising:

an elongate tube having an inlet and an outlet at respective opposite ends and a flexible wall portion extending longitudinally between the ends and consisting essentially of a confined body of liquid so that the tube forms a resonant cavity; and a buzz source connected to the inlet end, so that the resonant frequencies of the tube can be controllably altered by constriction thereof at selected different locations to emit one of simulated of animal and human vocal sounds/utterances from the outlet.

The buzz source which simulates the glottis and vocal chords is a high speed reciprocating valve admitting periodic puffs of air from a pressure source. This valve is analogous to the human voice box and normally should not provide any cylindrical sections other than those of the tracts above and below it so that the sound is perceived to be human. The human ear is very discerning and if buzz sources such as rearward facing reeds (as in pipe organs) or flapper valves are utilized, the resulting sound is perceived as artificial. Examination of spectra produced by such devices reveals undesirable spectral distributions.

The material used for the flexible portions of the vocal tract comprises water held in place by a carrier. The carrier can be a material which absorbs or adsorbs water and can retain its shape. An example of an embodiment, is open-cell foam rubber in the shape of a generally cylindrical or rectangular tube or, alternatively, in the shape of the vocal tract of the target being to be simulated whether human or animal. The foam is in intimate contact with a thin, flexible skin, covering its entire surface to prevent the escape of liquid from the bulk 'sorbent. The skin must be reasonably transparent acoustically. Some foam rubbers are self-skinning and may be used provided the skin is not too thick. The air within the foam is completely replaced with absorbed water or other incompressible liquid. The empty bore of the tube now becomes a resonant cavity possessing the desirable property of high acoustic Q, and the bore shape, especially its cross sectional area function, is easily altered due to the material's physical flexibility. Alternatively, the foam may be dispensed with and the water contained within a shape-defining skin alone.

A tube 17 cm in length is normally required to simulate the vocal tract of the average adult male and 15 cm for adult females. The tube may be straight or curved as it is in humans and other animals. Longer and shorter tubes simulate people and other creatures of corresponding size. The entire tube may be made of the flexible material, or, alternatively, some portions of the tube may be flexible, and other portions (such as the structures simulating the teeth and upper palette) may be made of rigid material. The tube may branch at one or more locations along its length to simulate the nasal and various sinus cavities. To produce speech sounds, one end of the tube is connected to a modulated air source producing a quasi-periodic flow in a manner similar to the human larynx. The other end is admitted to the air. Various widenings and constrictions along the tube's length are produced by deforming the tube via mechanical means resulting in a plurality of vowels, consonants, and their transitions. The output is natural sounding and indistinguishable from human utterances whether auditioned live or by recording.

This device produces synthetic vocal sounds which are indistinguishable from the natural. The use of water as the medium surrounding the resonant cavity simulating the vocal tract results in formant frequencies and amplitudes that are comparable to natural speech. Selected vocal tract cross-sectional area functions are attainable by mechanically deforming the cavity resulting in the creation of the various vowels and consonants. With synchronized mechanical actions and suitable excitation sources, continuous natural speech can be produced.

BRIEF DESCRIPTION OF THE DRAWINGS

In order that the invention may be readily understood a specific embodiment thereof will now be described, by way of example only, and with reference to the accompanying drawings in which:

FIG. 1 is a schematic view (not in proportion) of a demonstration apparatus for simulating the human voice;

FIGS. 2-4 are enlarge fragmentary cross-sectional views of a simulated vocal tract shown in FIG. 1 showing materials believed suitable for use as flexible acoustic reflectors.

PARTICULAR DESCRIPTION

The demonstration device which was constructed uses the liquid wall resonant cavity and electromagnetically driven artificial larynx for the purpose of imitating human speech sounds.

As shown in FIG. 1, the pressure of air supplied by air compressor (1) is regulated by utilizing charging accumulator 2, regulator 3 and gauge 4 to set the pressure in a chamber 5 simulating a sub-glottal system to 1.5-3" of water. The chamber (which is relatively much larger than shown in the drawing) is filled with fluff 6, which can be Dacron batting or sound-absorbing foam rubber, to dampen the Q of the sub-glottal system 5.

A valve 7 simulating a glottis and vocal chords comprises a flat sheet or diaphragm of silicone rubber (not shown) which extends transversely across a tubular outlet of the chamber 5 and is slit to define two flaps, driven directly, respectively, by two high-speed, low inertia positioners 8, 8' having motors 9, 9' (pen motors as found on chart recorders) providing a buzz source. The small amount of silicone rubber used at the rear of the vocal tract for this purpose does not spoil the Q of the tract, perceptibly.

The motors 8, 8' are driven by electrical pulse generator 11 through amplifier 12. The pen motors may be replaced with high speed voice-coil type linear actuators with superior results due to the higher power handling and increased efficiency of these devices. The duty cycle is arranged such that the valve (glottis) is closed longer than it is open within each cycle, the frequency of which is perceived as the fundamental frequency or pitch of the synthesized vocal output. This duty cycle, also known as the open quotient, mainly controls the high frequency spectral content of the system output resulting in a bright and sharp or mellow and breathy sound.

As a first approximation to a human adult male vocal tract, a flexible cylindrical acoustic resonator 13 was constructed of the skinned, liquid filled, foam rubber material forming a resiliently flexible tube of uniform cross section open at both ends, 17 cm long with 2.5 cm bore and 1 cm radial thickness.

The resonator was made by mixing four components, (latex base, foaming curing and gelling agents), sold by Burman Industries of Van Nuys, Calif., and injecting by a syringe into a mold formed by a cylindrical bottle having a coaxial core insert and three soda straws inserted axially for most of the bottle length at radially spaced locations to provide water irrigation channels or galleries in the foamed product. The core and straws were held in place by modeling clay. When cured the molded, foamed tube was removed from the bottle and the straws replaced by filling an drainage tubes of surgical Latex inserted into the channels/galleries for only approximately ½ inch.

The entire (inner and outer) surface of the cured foamed tube was then brush painted with SKINFLEX II a trademark of BJB Enterprises, CA. The skinned foamed tube was then saturated with water by compressing the tube while immersed in water to expel all air. The tubes were then clamped and could be unclamped when desired, for drainage.

An inlet end was sealed against the buzz source and the tube deformed/constricted by hand. When the modulated airstream from the buzz source was admitted to the tube, the latter was indented at 18, collapsed, or deformed, in combination and multiply to shift the acoustic resonances to produce utterances.

As a result of the nature of the foam rubber and skinning materials employed, it is much easier to collapse the bore of the tube than to expand it, the 2.5 cm bore of the demonstration device limited the range of vowel sounds produced and a larger bore, especially toward the exit opening or mouth is desirable. If deformation is to be accomplished by collapsing means only, it is believed that the ideal natural shape of the tube would be one that is pre-molded to the maximum required bore at each point along its length.

The flexible acoustic reflector 13 comprises water confined by some support means. This can be a sponge shown in FIG. 2, as used in the above described embodiment; possibly a gel, as shown in FIG. 3, preferably, with an impervious skin to prevent evaporation, or a balloon filled with water, as shown in FIG. 4. The support means should present the water to the acoustic waves either through a thin membranous covering or directly on its surface. The water is the dominant acoustic reflector and should be in intimate communication with the waves.

It is believed that liquids other than water, such as oils may be used in the acoustic reflector material.

The invention claimed is:

1. Apparatus for simulating one of human and animal vocal sounds comprising:

an elongate tube having an inlet and an outlet at respective opposite ends and a flexible wall portion extending longitudinally between the ends and consisting essentially of a confined body of liquid so that the tube forms a resonant cavity; and a buzz source connected to the inlet end and the outlet end being open to the air, so that the resonant frequencies of the tube can be controllably altered by constriction thereof at selected different locations to emit one of simulated of animal and human vocal sounds/utterances from the outlet.

2. Apparatus according to claim 1 wherein the wall portion is resiliently flexible.

3. Apparatus according to claim 1 wherein the liquid is water.

4. Apparatus according to claim 2 wherein the liquid is water.

5. Apparatus according to claim 1 wherein the confined body of liquid is a gel.

6. Apparatus according to claim 1 wherein the confined body of liquid comprises a flexible, solid, open cell sponge/foam in which substantially all cells thereof are filled with the liquid.

7. Apparatus according to claim 1 wherein the confined body of liquid comprises liquid contained in a flexible impervious membrane.

8. Apparatus for simulating one of human and animal vocal sounds comprising:

an elongate tube having an inlet and an outlet at respective opposite ends and a flexible wall portion extending longitudinally between the ends and consisting essentially of a confined body of liquid so that the tube forms a resonant cavity; and a buzz source connected to the inlet end, so that the resonant frequencies of the tube can be controllably altered by constriction thereof at selected different locations to emit one of simulated of animal and human vocal sounds/utterances from the outlet;

wherein the buzz source comprises a flexible diaphragm extending transversely across the inlet end and formed centrally with a transverse slit, and means for controllably altering a transverse width of the slit to simulate a glottis.

9. Apparatus according to claim 8 wherein the wall portion is resiliently flexible.

10. Apparatus according to claim 8 wherein the liquid is water.

11. Apparatus according to claim 8 wherein the confined body of liquid is a gel.

12. Apparatus according to claim 8 wherein the confined body of liquid comprises a flexible, solid, open cell, sponge/foam in which substantially all cells thereof are filled with the liquid.

13. Apparatus according to claim 12 wherein opposite surfaces of the sponge/foam are covered by a thin, flexible skin to improve retention of liquid in the sponge/foam.

14. Apparatus according to claim 8 wherein the confined body of liquid comprises liquid contained in a flexible impervious membrane.

15. Apparatus for simulating one of human and animal vocal sounds comprising:

an elongate tube having an inlet and an outlet at respective opposite ends and a flexible wall portion extending longitudinally between the ends and consisting essentially of a confined body of liquid so that the tube forms a resonant cavity; and a buzz source connected to the inlet end, so that the resonant frequencies of the tube can be controllably altered by constriction thereof at selected different locations to emit one of simulated of animal and human vocal sounds/utterances from the outlet;

wherein the confined body of liquid comprises a flexible, solid, open cell, sponge/foam in which substantially all cells thereof are filled with the liquid and having opposite surfaces covered by a thin, flexible skin to improve retention of liquid in the sponge/foam.

16. Apparatus according to claim 15 wherein the liquid is water.

* * * * *